June 7, 1960  C. W. JACKMAN  2,939,718
TANDEM AXLE SUSPENSION WITH EXTENDED EFFECTIVE SPRING BASE
Filed Nov. 7, 1957  2 Sheets-Sheet 1

INVENTOR.
Charles W. Jackman
BY
W. S. Pettigrew
ATTORNEY

June 7, 1960   C. W. JACKMAN   2,939,718
TANDEM AXLE SUSPENSION WITH EXTENDED EFFECTIVE SPRING BASE
Filed Nov. 7, 1957   2 Sheets-Sheet 2

INVENTOR.
Charles W. Jackman
BY
W. S. Pettigrew
ATTORNEY

United States Patent Office 2,939,718
Patented June 7, 1960

2,939,718

TANDEM AXLE SUSPENSION WITH EXTENDED EFFECTIVE SPRING BASE

Charles W. Jackman, Detroit, Mich., assignor to General Motors Corporation, Detroit, Mich., a corporation of Delaware Filed Nov. 7, 1957, Ser. No. 695,052

8 Claims. (Cl. 280—104.5)

This invention relates to vehicle suspension and more particularly, although not exclusively, to suspension for tandem axle vehicles.

An object of the present invention is to provide an improved suspension.

Another object is to provide a suspension having high roll resistance without the use of auxiliary roll stabilizing devices.

Still another object is to provide a suspension having an effective spring base which is substantially greater than the available space between the opposite wheels.

A further object is to provide a suspension permitting the use of a low rate of spring in vehicles having a high center of gravity.

A still further object is to provide a suspension wherein roll stability is proportional to spring rate when the spring rate is adjustable or variable.

Yet another object is to provide a vehicle suspension in which road shocks on the vehicle and load are substantially reduced.

Yet a further object is to provide an improved tandem axle suspension.

Still a further object is to provide an improved tandem axle suspension having a broad effective spring base affording high roll resistance without resorting to auxiliary roll stabilizers.

These and other objects, advantages and features of the invention will become more fully apparent as reference is had to the accompanying specification and drawings wherein.

Figure 1:
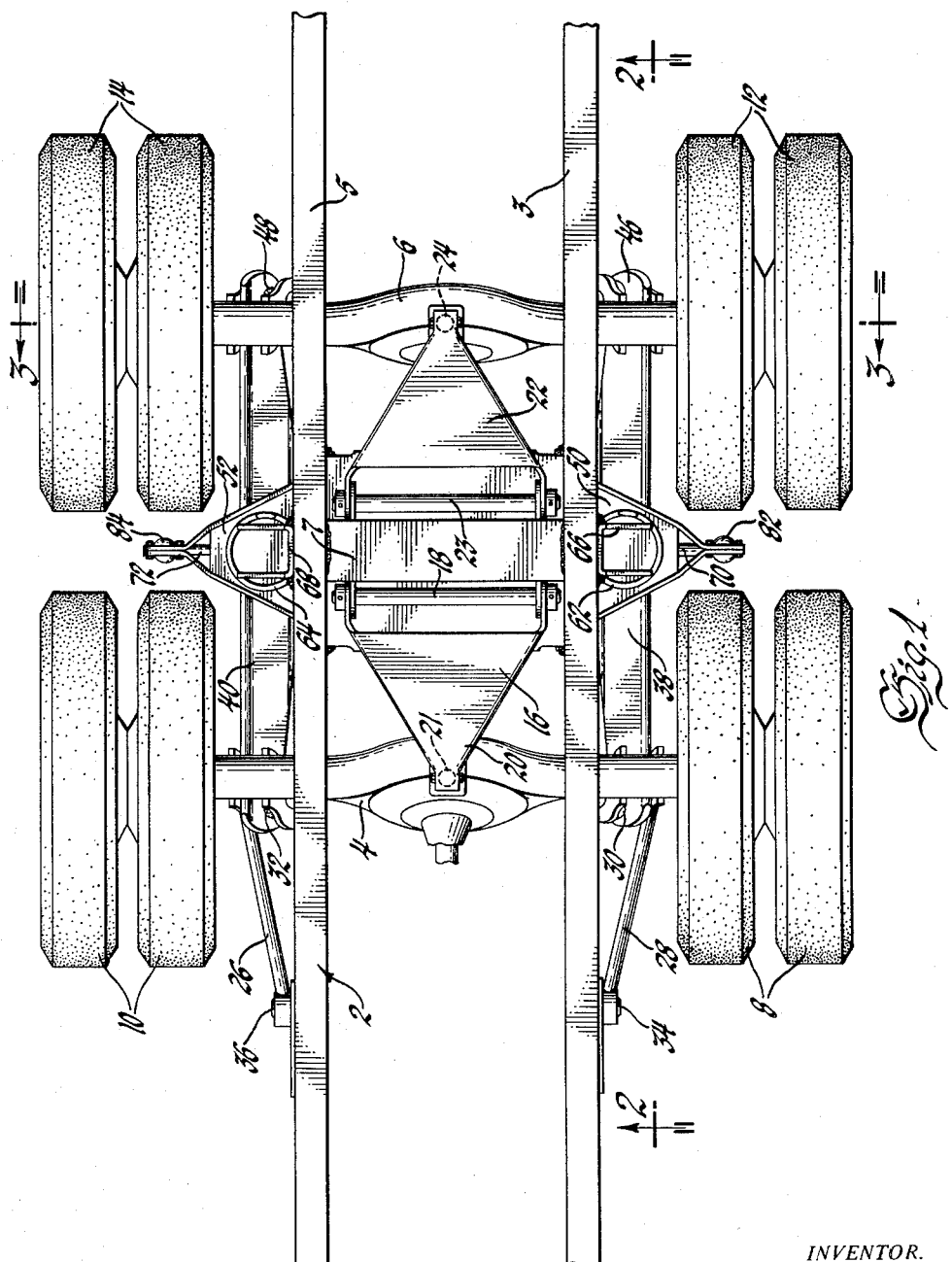
Fig. 1 is a top plan view of a tandem axle suspension according to the present invention.
Figure 2:
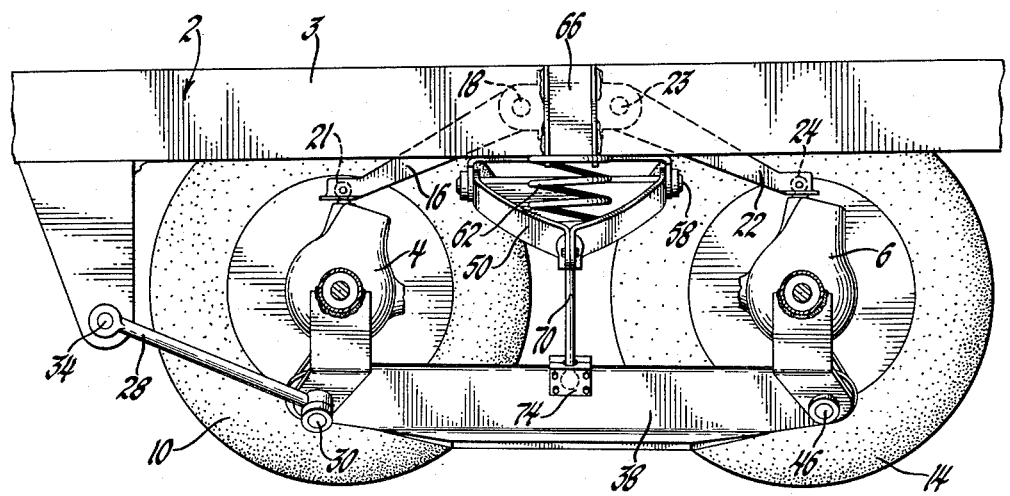
Fig. 2 is a side elevational view of the construction shown in Fig. 1.

Referring now to the drawings and particularly Fig. 1, the reference numeral 2 designates generally a vehicle frame including longitudinal side rails 3 and 5 and a cross member 7. Disposed beneath frame 2 at longitudinal opposite sides of cross member 7 are a pair of transversely extending axle assemblies 4 and 6, which are provided at their opposite ends with dual wheel assemblies 8–10 and 12–14, respectively. Extending forwardly from cross member 7 is a wishbone or A-frame member 16, the rearward end of which is pivotally secured to cross member 7 by a transverse pivot shaft 18. The forward end 20 of arm 16, in turn, is pivotally connected to axle 4 by means of a ball and socket connection 21. Rear axle 6 is similarly connected to cross frame 7 by means of a trailing A-frame member 22 having its forward end pivoted on a second transverse pivot shaft 23 and its rearward end pivotally connected to axle 6 by ball and socket connection 24. Axle 4 is also attached to frame member 2 by a pair of laterally spaced forwardly extending radius rods 26 and 28 which are connected to axle 4 by pin joints 30 and 32 and to frame 2 by pin joints 34 and 36. In order to provide the most effective control of fore and aft movement of each end of axle 4, the connections of radius rods 26 and 28 are preferably located as low and as far out as possible. Radius rods 26 and 28 function in conjunction with A-frame 16 to align the axle 4 transversely of the frame as well as to transmit braking and driving torque to the frame. Extending longitudinally between axles 4 and 6 are a pair of beams 38 and 40, the opposite ends of each of which are pivotally connected to axles 4 and 6 by pin joints 30, 32 and 46, 48, respectively. Beams 38 and 40 are preferably disposed below axles 4 and 6 in substantially longitudinal alignment with radius rods 26 and 28 and serve to maintain the two axles in parallel relation as well as to transmit the weight of the vehicle to the axles in a manner shortly to be described.

Figure 3:
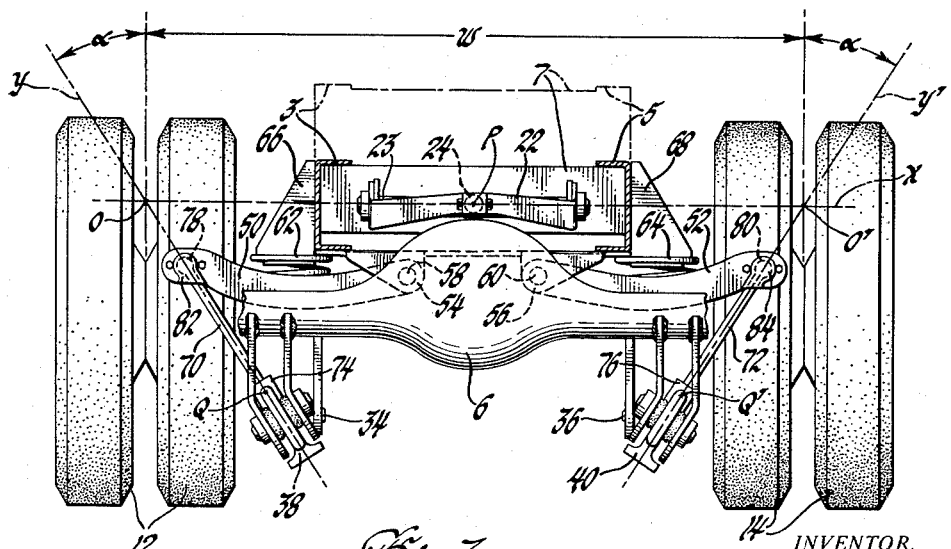
Fig. 3 is a rear elevational view of the invention illustrating the application of forces accomplished thereby.

Referring now particularly to Fig. 3, it will be seen that the underside of cross frame member 7 has mounted thereon a pair of laterally oppositely extending A-frame members 50 and 52, the inboard ends 54 and 56 of which are pivotally supported on longitudinally extending parallel pivot shafts 58 and 60. As seen best in Fig. 3, elastic means, as for example, a pair of coil springs 62 and 64, are disposed between outrigger spring seats 66 and 68 on frame 2 and the upper surfaces of A-frames 50 and 52. Extending downwardly from the outboard ends of A-frames 50 and 52 and engaging beams 38 and 40 longitudinally midway of axles 4 and 6, are a pair of thrust links 70 and 72. In the illustrated embodiment, links 70 and 72 are pivotally connected to beams 38 and 40 by joints 74 and 76, while the upper ends thereof are formed with spherical heads 78 and 80 which engage corresponding socket portions 82 and 84 formed in the outboard ends of A-frames 50 and 52. As a result, vehicle load is transmitted to the axles by compressively loading the outwardly and upwardly inclined thrust links. It will be understood, however, that the invention is not limited to a construction utilizing compressively loaded links 70 and 72. Similarly, springs 62, 64 may be air bellows, rubber cushions, or any other suitable elastic medium.

In order that the invention may be more fully understood, an explanation of the mechanics of load transmission follows. Under conditions of normal vehicle load as illustrated in Fig. 3, or where springs are adjustable to maintain a constant vehicle height regardless of load, the height of frame 2 above axles 4 and 6 is such that shaft 23 and ball socket 24 will occupy the same horizontal plane designated by line X. Ball socket 24 is free to move vertically due to the hinge action of the A-frame 16 about pivot shaft 22, while axle 6 may rock or rotate about the point P defining the center of ball socket 24. Hence, the roll center of the vehicle is located at the height of plane X and passes longitudinally through the center of ball socket 24 designated as point P.

Points O and O' are located on line X equidistant from point P, a preselected distance W which provides the desired virtual or effective spring base of the suspension. The location and inclination of thrust links 70 and 72 is then selected so that the load application points Q, Q' are substantially vertically aligned with springs 62 and 64, while the projected axis of the links intersects points O and O', respectively. As a result, load is transmitted through points O and O' along axes Y and Y' to the axles 4 and 6 through the effective load application of points Q and Q' on longitudinal beams. Inasmuch as forces transmitted along lines Y and Y' are greater than the weight supported, the sum of forces along $Y$ and $Y' = \dfrac{\text{weight supported}}{\cos \alpha}$ where $\alpha$ is the angle between lines Y and Y' and the vertical. Resistance to roll is a function of the resisting couple about point P. Therefore, the resisting force along line Y or Y' creates a couple about point P so that $$\text{couple} = \text{force along } Y \times \frac{W}{2} \times \cos \alpha$$

$$= \text{vertical force at point } O \times \frac{W}{2}$$

Therefore, the distance W between points O and O' is the effective spring base upon which the vertical spring rate of suspension is effective in resisting roll. For a given vertical spring rate, the roll resistance or torque about point P to produce a unit angular roll is proportional to $W^2$; hence, an increase in W rapidly effects increased roll resistance.

While but one embodiment of the invention has been shown and described, it will be evident that other changes and modifications may be made therein. Therefore, it is to be understood that it is not intended to limit the invention to the embodiment shown, but only by the scope of the claims which follow.

I claim:

1. In a vehicle having a frame, a pair of wheels, a rigid axle connecting said wheels, vertically oscillatable axle constraining means defining a roll center, a pair of springs on said frame adjacent each of said wheels, load transmitting means disposed between said axle and said springs, said means comprising a pair of links each connected to said axle in substantially vertical alignment with its associated spring and extending outwardly and upwardly so that the projected axis thereof intersects the horizontal plane of said roll center outwardly of said springs.

2. In a vehicle having a frame, a pair of longitudinally spaced rigid axle assemblies each including spaced road engaging wheels, linkage means controlling oscillation of said axles and defining a roll center therefor, spring means engaging said frame between said axles, a pair of longitudinal beams connecting said spaced axles, and load transmitting means disposed between said beams and said spring means adapted to provide an effective spring base substantially in excess of the distance between said springs, said means comprising thrust rods disposed so that the projected axes thereof intersect the horizontal plane of the roll center outwardly of said springs.

3. The invention set forth in claim 2 wherein said rods are connected to said beams at points substantially vertically aligned with the associated spring.

4. In a vehicle having a frame, a pair of longitudinally spaced axle assemblies each including spaced road engaging wheels, linkage means controlling oscillation of said axles and defining a roll center therefor, spring means engaging said frame between said axles, a pair of longitudinal beams connecting said spaced axles, and load transmitting means disposed between said beams and said spring means adapted to provide an effective spring base substantially in excess of the distance between said springs, said means comprising transverse wishbone arms hinged to said frame and engaging said springs and thrust rods disposed between said axle and the free ends of said wishbone arms, so that the projected axes thereof intersect the horizontal plane of the roll center outwardly of said springs.

5. Axle suspension for vehicles comprising, a frame, a pair of wheels rotatably supported on a transversely extending axle, a pair of laterally spaced radius rods pivotally connnected at their opposite ends to said axle and frame respectively, a wishbone arm hinged at one end to said frame on a transverse axis, means pivotally connecting the other end to said axle, a pair of oppositely directed transversely extending wishbone arms each hinged to said frame on a longitudinal axis, spring means disposed between said frame and said transverse wishbone arms, and a pair of thrust links disposed respectively between said axle and each transverse wishbone arm, each link being inclined outwardly and upwardly so that the projected axis thereof intersects the horizontal plane of said first mentioned wishbone arm at a point substantially laterally outwardly of said spring means.

6. Axle suspension for vehicles comprising, a frame, a pair of wheels rotatably supported on a transversely extending axle, a pair of laterally spaced radius rods pivotally connected at their opposite ends to said axle and frame respectively, a wishbone arm spaced above said links and hinged at one end to said frame on a transverse axis, means pivotally connecting the other end of said arm to said axle, a pair of oppositely directed transversely extending wishbone arms each hinged to said frame on a longitudinal axis, spring means disposed between said frame and said transverse wishbone arms, and a pair of thrust links disposed respectively between said axle and each transverse wishbone arm, each link being inclined outwardly and upwardly so that the projected axis thereof intersects the horizontal plane of said first mentioned wishbone arm at a point substantially laterally outwardly of said spring means.

7. Axle suspension for vehicles comprising, a frame, a pair of wheels rotatably supported on a transversely extending axle, a pair of laterally spaced radius rods pivotally connected at their opposite ends to said axle and frame respectively, a forwardly extending wishbone arm spaced above said links and hinged at one end to said frame on a transverse axis, means universally pivotally connecting the other end of said arm to said axle, a pair of oppositely directed transversely extending wishbone arms each hinged to said frame on a longitudinal axis, spring means disposed between said frame and said transverse wishbone arms, and a pair of thrust links disposed respectively between said axle and each transverse wishbone arm, each link being inclined outwardly and upwardly so that the projected axis thereof intersects the horizontal plane of said first mentioned wishbone arm at a point substantially laterally outwardly of said spring means.

8. Axle suspension for vehicles comprising, a frame, a pair of axles each having road engaging wheels at opposite ends thereof, a pair of laterally spaced radius rods pivotally connected at their opposite ends to one of said axles and frame respectively, a pair of laterally spaced beams connecting said axles, a pair of oppositely directed longitudinally extending wishbone arms hinged at one end to said frame on transverse axes, means pivotally connecting the other ends of each of said arms to one of said axles, respectively, a pair of oppositely directed transversely extending wishbone arms each hinged to said frame on a longitudinal axis, a spring disposed between said frame and each transverse wishbone arm, and a pair of thrust links disposed respectively between said beams and each transverse wishbone arm, each link being inclined outwardly and upwardly so that the projected axis thereof intersects the horizontal plane of said first mentioned wishbone arm at a point substantially laterally outwardly of its associated spring.

References Cited in the file of this patent

UNITED STATES PATENTS

| | | |
|---|---|---|
| 240,623 | Tilden | Apr. 26, 1881 |
| 1,205,390 | Randall | Nov. 21, 1916 |
| 1,517,134 | Wade | Nov. 25, 1924 |
| 1,575,293 | Van Meter | Mar. 2, 1926 |
| 2,242,030 | Hicks | May 13, 1941 |
| 2,458,816 | Woods | Jan. 11, 1949 |
| 2,563,261 | Oster | Aug. 7, 1951 |
| 2,806,713 | Muller | Sept. 17, 1957 |